(12) United States Patent
Roby

(10) Patent No.: US 7,191,519 B2
(45) Date of Patent: Mar. 20, 2007

(54) METHOD FOR THE MANUFACTURE OF A VANED DIFFUSER

(75) Inventor: Steve Roby, Ashville, NC (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 10/646,972

(22) Filed: Aug. 22, 2003

(65) Prior Publication Data
US 2005/0039334 A1  Feb. 24, 2005

(51) Int. Cl.
*B23P 15/00* (2006.01)
*B23P 15/02* (2006.01)
*B22D 29/00* (2006.01)

(52) U.S. Cl. ............... 29/889.2; 29/889.21; 29/527.5; 29/527.6; 164/47; 164/69.1; 164/70.1; 164/131

(58) Field of Classification Search ........... 29/889.021, 29/889.01, 888.025, 889.2, 889.22, 527.5, 29/527.6; 164/47, 235, 349, 69.1, 70.1, 131, 164/DIG. 15
See application file for complete search history.

(56) References Cited

U.S. PATENT DOCUMENTS

| | | | | |
|---|---|---|---|---|
| 1,047,663 A | * | 12/1912 | Lawaczeck | 415/208.3 |
| 2,844,001 A | * | 7/1958 | Alford | 138/40 |
| 3,079,068 A | * | 2/1963 | Williams et al. | 415/209.1 |
| 3,719,430 A | * | 3/1973 | Blair et al. | 415/207 |
| 3,860,360 A | * | 1/1975 | Yu | 415/208.3 |
| 3,873,232 A | * | 3/1975 | Stein et al. | 415/207 |
| 3,936,223 A | * | 2/1976 | Baghdadi | 415/208.4 |
| 3,973,872 A | * | 8/1976 | Seleznev et al. | 415/208.3 |
| 3,997,281 A | * | 12/1976 | Atkinson | 415/207 |
| 4,027,723 A | * | 6/1977 | Maurino et al. | 164/213 |
| 4,705,463 A | * | 11/1987 | Joco | 417/407 |
| 4,815,935 A | * | 3/1989 | Gottemoller | 415/211.1 |
| 5,011,371 A | * | 4/1991 | Gottemoller | 415/211.1 |
| 5,277,541 A | * | 1/1994 | Palmer | 415/58.2 |
| 5,399,064 A | * | 3/1995 | Church et al. | 415/58.3 |
| 6,019,927 A | * | 2/2000 | Galliger | 264/221 |
| 6,164,931 A | * | 12/2000 | Norton et al. | 417/407 |
| 6,220,234 B1 | * | 4/2001 | Baker et al. | 60/605.1 |

* cited by examiner

*Primary Examiner*—Jermie E. Cozart
(74) *Attorney, Agent, or Firm*—Akerman Senterfitt; Greg Dziegielewski

(57) ABSTRACT

An improved method for manufacturing a vaned diffuser (101) of a turbocharger, preferably from aluminum or an aluminum alloy, where the vaned diffuser possesses at least one axis (115) suitable for separating the vaned diffuser from its rigid mold by translation. Casting of a raw vaned diffuser (407) having an optional central hub (205) and, optionally, ribs on the hub (209), is disclosed in a plaster mold (305). The hub and optional ribs are machine finished from the raw vaned diffuser to yield the finished vaned diffuser (101). The method provides the high degree of dimensional accuracy, and high quality surface finish, required to produce a vaned diffuser of an efficient turbocharger.

12 Claims, 4 Drawing Sheets

METHOD FOR THE MANUFACTURE OF A VANED DIFFUSER

FIELD OF THE INVENTION

The present invention relates to an improved method for the manufacture of a vaned diffuser of a type-used in an exhaust driven turbocharger to accept high-velocity air from a compressor wheel and provide pressurized air to an internal combustion engine. Specifically, the invention relates to an improved method for the manufacture of a vaned diffuser having a complex geometry and a pullable axis. The method further relates to a casting process that provides a vaned diffuser having high degree of dimensional trueness, repeatable manufacture, and a high quality surface finish, compared to conventional machining of a vaned diffuser from solid metal.

DESCRIPTION OF THE RELATED ART

Turbochargers are widely used in internal combustion engines to increase engine power and efficiency, particularly in the large diesel engines of highway trucks and marine engines. It is particularly advantageous in these types of engines to use turbochargers that are designed to provide a very high pressure ratio (the differential pressure across the compressor), compared, for example, to turbochargers typically used in smaller passenger engines. The use of a turbocharger permits selection of a power plant that develops a required number of horsepower from a smaller and lighter engine. The use of a lighter engine has the desirable effect of decreasing the total mass of the vehicle, and the reduced envelope of a smaller engine may be used to enhance the aerodynamics of the vehicle and thus reduce drag. Both of these factors enhance fuel economy and increase performance. In addition, the use of a turbocharger permits more complete combustion of the fuel delivered to the engine, which reduces hydrocarbon and $NO_x$ emissions, thereby contributing to the highly desirable goal of a cleaner atmosphere. Recently, turbochargers have also become increasingly popular for use in smaller, passenger car engines.

Turbochargers generally comprise a turbine housing that directs exhaust gases from an exhaust inlet to an exhaust outlet across a turbine rotor. The turbine rotor drives a shaft journaled in a bearing housing section. A compressor rotor is driven on the other end of the shaft, which provides high-velocity air to a diffuser.

The general design and function of turbochargers is described in detail in the prior art, for example, U.S. Pat. Nos. 4,705,463; 5,399,064; and 6,164,931, the disclosures of which are incorporated herein in their respective entireties by reference.

In a radial-flow or centrifugal turbocharger, the compressor rotor receives and pressurizes the inlet gas. The compressor rotor discharges the gas with high tangential and radial components of velocity. The gas flows over a diffuser, in which the kinetic energy, or velocity head, is converted to a static pressure by deceleration or diffusion of the flow, and the temperature and pressure of the gas are increased. The increased temperature improves combustion efficiency, while the increased static pressure at the engine inlet may be used to increase the mass of air/fuel mixture in the cylinder, and/or to improve the air:fuel ratio.

The design of turbocharger compressors is a highly refined art. The shape, curvature, and surface finish of the compressor rotor, compressor housing, and diffuser are designed to produce maximum pressure boost across the desired range of operating conditions. When very high pressure ratios are required, as in the case of large commercial diesel engines, vaned diffusers are generally preferred over vaneless diffusers because they provide a higher maximum pressure ratio and increased efficiency, albeit frequently at the cost of a reduced map width, as depicted on a compressor map well known in the art as showing the relationship between pressure ratio and volume or mass flow rate.

The design of the diffuser is critical to achieving efficient turbocharger operation over a usefully wide range of engine operating conditions. While it is relatively straightforward to design a diffuser for constant inlet and outlet conditions, variations in the flow rate, and the nature of the flow increase the difficulty of providing a satisfactory diffuser for a useful range of operating conditions.

Design parameters for compressors have been refined to the extent that a change of the order of 0.5–1.0% in efficiency is significant within the art. A general rule of thumb is that each one percent improvement in the efficiency of the compressor produces a one-third percent improvement in the brake specific fuel consumption (BSFC) of a diesel engine.

The vanes of a vaned diffuser define channels into which high velocity gas from the compressor is received, and through which the gas is decelerated in order to convert its kinetic energy into a static pressure. Circumferentially spaced guide vanes provide passages that expand radially in area to diffuse the flow. Because the gas flow characteristics vary with operating conditions, a high-quality surface finish and the angle of attack of the vanes are critical parameters in the design of an efficient vaned diffuser.

The cross-section and shape of the vanes of a vaned diffuser are also important design parameters. Wedge-shaped, straight-sided blades, referred to as straight island type, provide a high pressure ratio and high efficiency at the expense of operating range. On the other hand, curvilinear cross-section blades permits flow straightening in the diffuser, as disclosed in U.S. Pat. No. 2,844,001. Vanes that have an aerofoil cross-section are also known in the art, as are vanes that are divided along their length, in which each portion is optionally radially offset. For smooth and uniform exit flow from the diffuser, thin edged vanes are desirable. The width of the diffuser is also an important design parameter. Therefore, in order to implement the best designs and to reap their intended benefits, it is necessary that the vanes of the diffuser are manufactured to very close tolerances.

The typical design parameters for vaned diffusers are disclosed in the prior art, for example, in U.S. Pat. Nos. 2,844,001; 1,047,663; 3,936,223; 3,997,281; 3,719,430; 4,815,935; and 5,277,541, the disclosures of which are incorporated herein in their entireties by reference.

For the above reasons, a very high degree of dimensional trueness is required in the manufacture of a vaned diffuser. Molding techniques, which are known in the art to experience shrinkage, warpage, and distortion, do not come into consideration for the manufacture of vaned diffusers. Instead, vaned diffusers are exclusively manufactured by machining from solid metal.

While investment casting is used to manufacture the impeller or rotor of a turbocharger, a different set of design limitations apply to vaned diffusers, which therefore require a different manufacturing procedure. Impeller vanes typically have a complex geometry that require the use of flexible mold materials, such as silastic, in order to permit the separation of molds and moldings. Silastic molds are also required because impeller wheel castings lack a pullable axis whereby the mold and molding may be separated without damage along a translational axis.

U.S. Pat. No. 6,019,927 to Galliger, entitled "Method of Casting a Complex Metal Part" discloses a flexible and resilient positive molding pattern that is used to cast a ceramic shell mold for casting complex metal parts from high temperature materials such as ferrous alloys or titanium. The method requires multiple ceramic layers and firing of the ceramic mold to permit the use of high temperature casting materials. This process requires additional steps to (a) produce flexible intermediate moldings, and (b) produce and fire a multiple-layer ceramic mold that can withstand the use of high-temperature casting materials, and is therefore time-consuming and expensive.

U.S. Pat. No. 5,494,096 to De Antonio Gonalons et al., entitled "Investment Casting Process" discloses a method for the production of a ceramic shell mold for casting metal parts, in which the ceramic shell is produced using an investment casting process, and a series of temporary positive and negative patterns are cast using materials having different melting points. This method suffers from the same drawbacks and limitations as U.S. Pat. No. 6,019,927 to Galliger.

U.S. Pat. No. 4,027,723 to Maurino discloses a molding apparatus for manufacturing articles having radially inwardly extending projections on an interior surface. The use of a collapsible flexible mold and mandrel is disclosed to facilitate the casting of projections. Although the method provides for the casting of an interior surface having radially inward projections, which may also describe the vanes of a vaned diffuser, the method suffers from the drawback of requiring the use of a flexible mold, which causes a loss of accuracy compared to a rigid mold. Thus, although this may be a suitable method for the casting of brake drums, the loss of accuracy caused by the use of a flexible mold renders the method unsuitable for the casting of a diffuser. In addition, additional parts and steps are required, such as the use of the mandrel to support the flexible mold, and partial evacuation to collapse the flexible mold to facilitate its removal from the cast.

In view of the complexity of their design parameters, the need for precise vane and channel dimensions, the requirement for a low-drag surface finish, and the ability to withstand high operating temperatures, vaned diffusers are manufactured in the art by machining from solid metal, which is time-consuming, expensive, and wasteful of materials.

It would therefore be advantageous to provide a method for the production of a vaned diffuser, which provides for low-cost, repeatable, reproducible manufacturing, while retaining the high-quality surface finish and close tolerances required for an efficient and durable vaned diffuser.

SUMMARY OF THE INVENTION

Vaned diffusers have not, prior to the present invention disclosed herein, been manufactured by casting. Those of ordinary skill in the art would have foreseen difficulties in producing the required high-quality surface finish, in achieving the close dimensional tolerances required, in successfully flowing the liquid material through the relatively long and thin blade casting channels, and in separating such a vaned diffuser from its cast without damage. These and other factors have mitigated against the use of casting as a method to produce a vaned diffuser.

The present invention is directed to an improved method for the manufacture of a vaned diffuser, as used within the compressor stage of a turbocharger, which is suited for high volume production. The casting method of the present invention is also useful for the casting of other types of non-ferrous part comprising fine vanes or projections where such a part also possess an axis for direct pulling of the part, and where precision dimensions and high surface quality as is provided by casting in plaster, are desired.

In accordance with a first embodiment of the invention, there is provided a method for the manufacture of a non-ferrous vaned diffuser, preferably from aluminum. In this method, a male metallic template of a vaned diffuser is first prepared that includes a) a central portion comprising a hub that facilitates casting, machining, and finishing of the diffuser, and (b) at least the upper surface of the vaned diffuser comprising the vanes. A female plaster mold is cast from the male metallic template by applying a plaster slurry to the male template and allowing the plaster to dry and harden within a suitable frame. The hardened female plaster mold is then separated from the male template along the translational axis corresponding to the central hub axis, and herein termed the "pullable axis." Molten metal, preferably non-ferrous metal or alloy having a melting point of less than about 700° C., more preferably molten aluminum, is introduced into the plaster female mold assisted by evacuation of the plaster mold, and the metal is then permitted to cool and solidify. The metal vaned diffuser casting is pulled to separate it from the plaster cast along the pullable axis or translational axis corresponding to the central hub axis. Finally, machine finishing removes the hub and to yield the near-net vaned diffuser, which may be finished by conventional means.

In a second embodiment of the method of the present invention, the hub of the male metallic template further comprises a plurality of ribs radially disposed about the hub. These ribs facilitate the delivery of molten metal to the vane castings and reduce ringing of the metal casting during machining by increasing the natural frequency of the casting. In this embodiment, it is preferred to provide a gap between the ribs and the vanes sufficient to permit separation of the finished ring diffuser from the hub without the necessity of machining through the ribs.

Other features and advantages of the invention will become apparent from the following description, the accompanying drawings, and the appended claims.

BRIEF DESCRIPTION OF THE DRAWINGS

For a more complete understanding of the nature and objects of the present invention, reference should be made to the following detailed description taken together with the accompanying drawings.

DETAILED DESCRIPTION OF THE INVENTION

Figure 1:
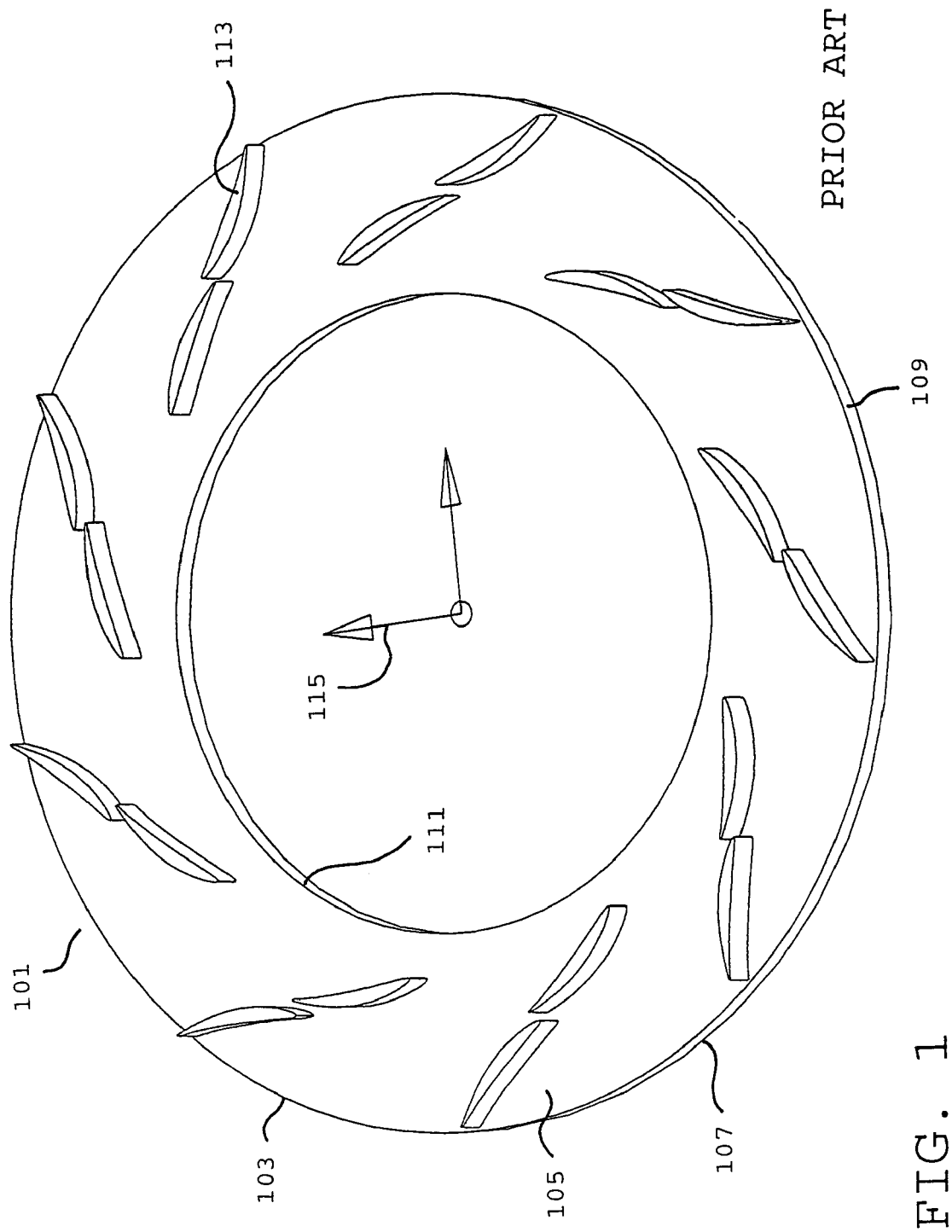
FIG. 1 shows a vaned diffuser of the prior art.

For the purpose of illustrating the method steps of the present invention, FIG. 1 illustrates a vaned diffuser 101, which is known in the prior art to be produced by machining from solid metal, but production of which is described herein according to the method of the present invention. The vaned diffuser comprises a essentially disc-shaped portion 103, having an approximately flat upper surface 105 and an approximately flat lower surface 107, which is essentially parallel to the upper surface, and also having an outer circumferential edge 109 and an inner circumferential edge 111. From the upper surface 105 of the disc, a plurality of vanes 113 extend approximately perpendicularly from said surface 105. The vanes 113 are positioned, in the assembled turbocharger, to accept high velocity air from a compressor wheel located approximately within the inner circumferential edge 111 of the diffuser, and rotating about a central perpendicular axis 115.

Figure 2:
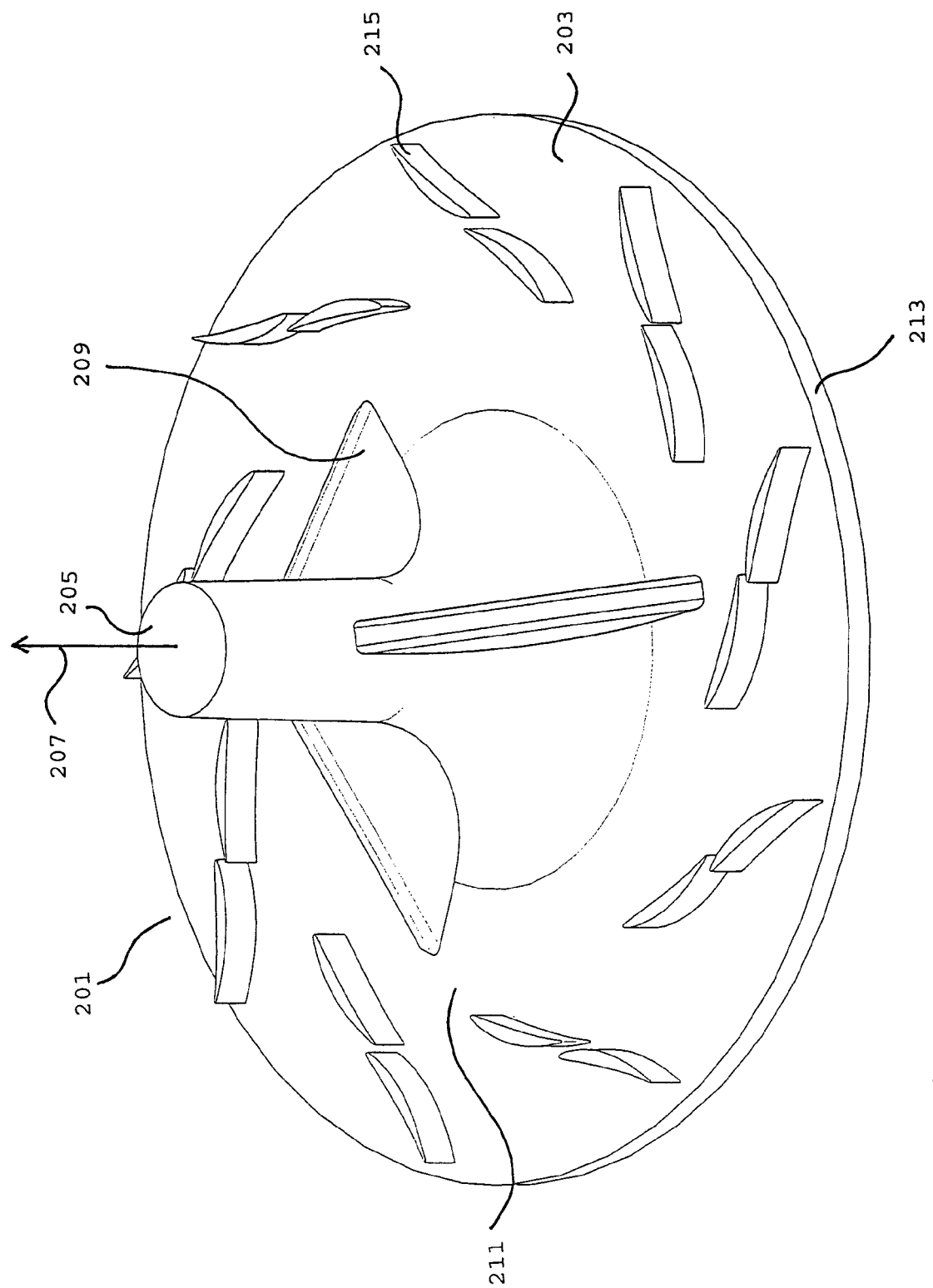
FIG. 2 shows a male metallic template of the present invention.

Referring now to FIG. 2, a male metallic template 201 is shown, which is used in the method of the present invention. The male metallic template 201 comprises an essentially disc-shaped portion having an upper surface 203 upon which are disposed vanes 215. The vanes 215 and upper surface 203 correspond to the vanes 113 and upper surface 105 of the finished diffuser, and a central hub 205 centered upon the central axis 207, which corresponds to the axis of rotation 115 of the compressor wheel. Optionally, a plurality of webbed metallic portions or webs 209 are radially disposed about central axis 207, between the central hub 205 and the disc portion 203 of the male metallic template 201. Between the optional webbed portions 209 and the vanes, a portion of the disc devoid of either vanes or webbing 211 is optionally provided in order to facilitate machining to separate a finished vaned diffuser 101 from a raw vaned diffuser casting 201.

The radius of the male metallic template 201, defined as the distance from axis 207 to outer circumferential edge 213, is preferably greater than the corresponding radius of the finished vaned diffuser 101, defined as the distance from axis 115 to outer circumferential edge 109, to allow for machine finishing of the outer circumferential edge.

Although the vaned diffuser and its corresponding male metallic tool have been described above in a preferred embodiment, the method of the present invention is not thereby limited in its scope to these particular embodiments. The method of the present invention is broadly applicable to the manufacture of vaned diffusers having an axis, such as, for example, axis 207, along which the molds and moldings of the present invention can be separated or pulled without damage to mold or molding. For the purposes of the description of the present invention, axes 115, 207, 303, and 403 are regarded as equivalent.

The steps of the method of the present invention are now illustrated with reference to FIGS. 1–4. A male metallic template is provided that comprises at least an upper surface and vanes corresponding to the upper surface and vanes of a finished vane diffuser. The male metallic template further comprises a central hub and optional ribs.

Figure 3:
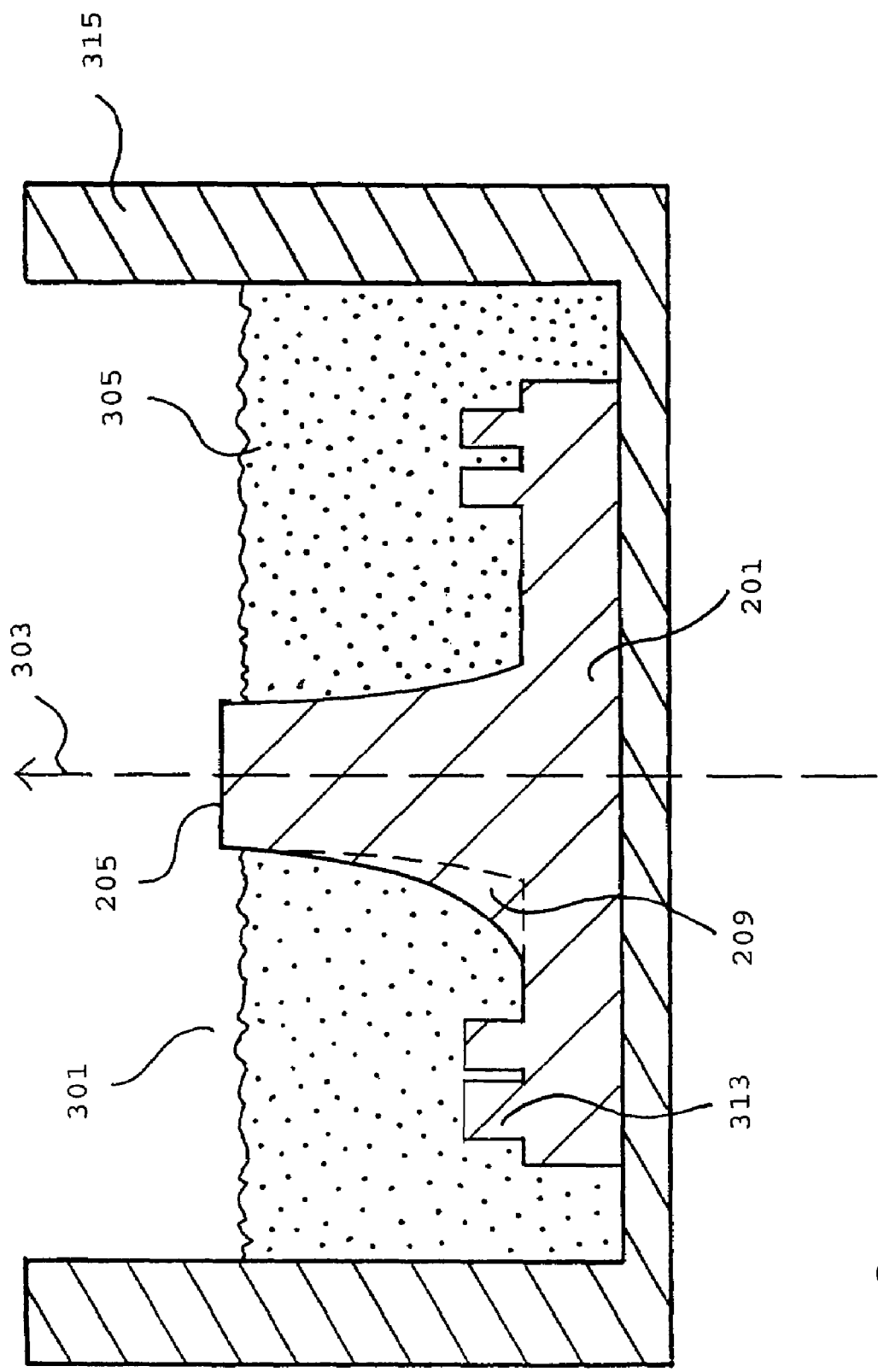
FIG. 3 shows a cross-sectional view of the female plaster mold of the present invention in contact with a male metallic template.

Referring now to FIG. 3, the male metallic template is used as a mold to cast a female plaster mold comprising at least a surface complementary to the upper surface of the male metallic template. The material used to prepare the female plaster mold is not particularly limited. A slurry comprising one of the many commercially available foundry plasters known to one of ordinary skill in the art is suitable for use in the present invention, such as, for example, ALCAST or AIRLITE produced by Specialist Refractory Services Limited of Derbyshire, England, or Hoben's foundry plaster, or their equivalent. Preferably, the plaster has a high green strength and good thermal shock properties, making it resistant to damage during pulling from the template. Optionally, a plaster specially formulated for mixing under vacuum may be used, or a plaster (Hoben) designed to be used with a foamed mixing technique where air is intentionally entrained to provide a mold which is particularly suited for thin walled pieces produced by counter gravity casting.

The plaster slurry is poured over at least the upper surface of the male metallic template within a suitable frame and is permitted to harden. Preferably, the plaster is cast by pouring liquid plaster over the metallic template placed in a suitable container 313 with the lower surface of the template placed upon the bottom of the box.

Referring now to FIG. 3, a female plaster cast 305 of the upper surface of a male metallic template 201 is shown in cross-section 301. The shape or surface finish of the lower surface of the male metallic template is not particularly limited. After the plaster hardens, the female plaster and male metallic template are separated along the axis 303. The lower surface of the male metallic template is optionally adapted to facilitate pulling, for example by machine pulling, in order ensure accurate translation of the female plaster along axis 303, thereby minimizing the risk of damage to the plaster molding surfaces. Preferably, the metallic mold 201 is placed in a frame 315 and plaster is poured to a level below that of the top of the hub 205. By this means, a pathway for later casting of the aluminum is provided, and the plaster produces an accurate casting of features of the metallic mold, including the vanes 313 and ribs 209.

Figure 4:
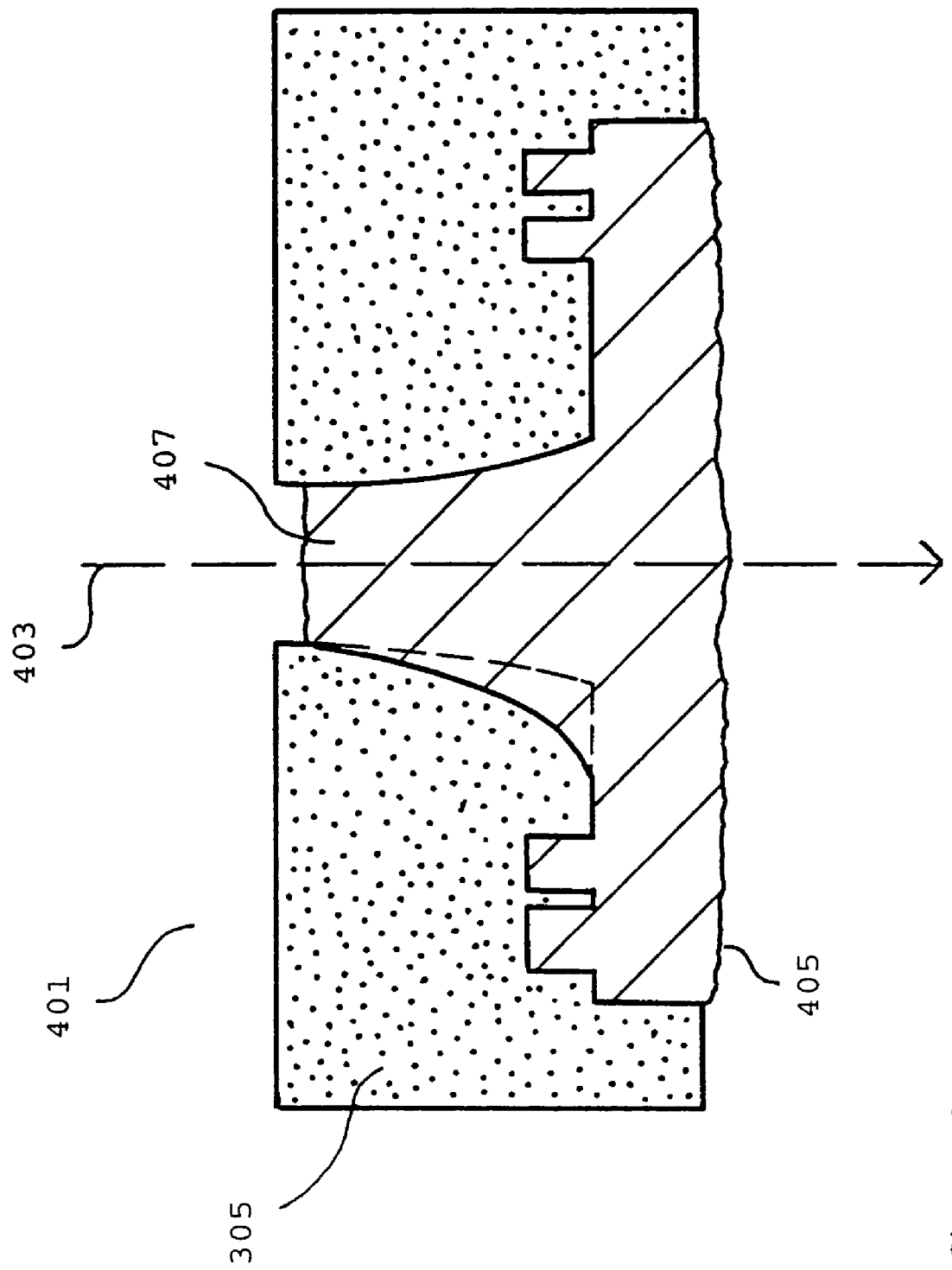
FIG. 4 shows a cross-sectional view of a female plaster mold in contact with a raw vaned diffuser casting of the present invention.

Referring now to FIG. 4, the female plaster mold 305 is shown in cross-section 401 filled with a molten non-ferrous metal 407, preferably aluminum. A vacuum or partial vacuum is preferably applied to the mold in a suitable frame to ensure complete filling of the portions of the mold corresponding to the vanes 113 of the finished vane diffuser 101. The depth to which the mold is filled with molten metal 405 is greater than the thickness of the finished vaned diffuser, but is not otherwise limited. Preferably, the molten metal is drawn upwards into the mold, as shown in FIG. 4. The mold is cooled and the raw vaned diffuser casting is separated from the female plaster mold along axis 403. Optionally, further cleaning of the raw vaned diffuser casting is performed by conventional cleaning means, for example by a pressurized liquid.

The vanes 113 are not particularly limited with respect to their shape provided that the female plaster mold is capable of being separated from the male metallic template by pulling along the axis 301 without damage to the female plaster mold sufficient to substantially impair the performance of the finished vaned diffuser. Thus, as measured in any plane perpendicular to axis 207, the method of the present invention is adaptable to vanes that are curved or vary in their cross-section. However, as measured in any plane parallel to axis 207, the present method is not preferred for vanes having a substantial undercut, such as vanes that become substantially thinner close to the lower surface 105.

It is to be understood that the means of separating molding of the present invention along the pulling axes 303 and 403 optionally also comprises a rotational component. The combination of translational motion along these axes with an optional rotation produces a screw-like separation or pulling. Thus, the manufacture of a vaned diffuser that comprises vanes 313 that are disposed about the pulling axis 303 with screw-like symmetry also falls within the scope of the method of the present invention. Where a screw-pulling axis is present, the molds and moldings can be separated without significant damage.

The metal used in casting the vaned diffuser according to the method of the present invention is a non-ferrous metal or alloy suitable for casting in a plaster mold. Aluminum is preferred because of its lightness and corrosion resistance under the extreme operating environment of a turbocharger.

Most preferably, a castable aluminum alloy is used that has improved properties, such as A206, 355, or 354. Suitable aluminum alloys also include, but are not limited to, silumins, which can possess a silicon content in a range from about 11% to about 35%. Other suitable aluminum alloys include all of the Aluminum Association Registered Alloys such as the 1xxx, 2xxx, 3xxx, 4xxx, 5xxx, 6xxx, and 8xxx families of alloys. Other non-registered alloys may also be used.

Optionally, if the vaned diffuser comprises silumin alloy-based compounds, the vaned diffuser may also comprise hardening agents, such as silicon carbides (SiC) and aluminum oxides ($Al_2O_3$). The silicon in the alloys, in combination with the above agents, may enhance the heat resistance and wear properties of the diffuser, and may also enhance the structural strength of the vanes, which is advantageous because each time a compressor wheel blade passes a vane, the vane receives an aerodynamic pressure pulse.

Aluminum and its alloys are prone to oxidation while molten, and may exhibit surface imperfections after casting. These imperfections may include pits, vertical folds, oxide patches, and the like, which form during casting. Methods to reduce these imperfections and thereby improve surface properties are well known to those of skill in the art, and may be employed in the present invention. For example, alloys comprising from 5–1000 ppm calcium, optional additional grain refiners, optional alkaline earth, optional transition metals and/or rare earth metals, are taught in U.S. Pat. No. 6,412,164 to DeYoung et al., which have improved surface properties when cast. Related methods for improving the surface quality of cast aluminum alloys are disclosed in U.S. Pat. No. 5,469,911, and may also be employed in the present invention.

The raw vaned diffuser casting is machine finished to produce the finished vaned diffuser. With reference to the embodiment described herein, the raw vaned diffuser casting is machine-mounted by its hub and the lower disc portion is machined to the required thickness and finish. The outer circumferential edge 109 is machined to the required radius and finish. Finally, the finished vaned diffuser is separated from the hub, for example by machining away a circular portion of material including the portion devoid of either vanes or webbing, 211, to yield the finished vaned diffuser.

Various modifications and changes may be made by those having ordinary skill in the art without departing from the spirit and scope of this invention. Therefore, it is to be understood that the illustrated embodiments of the present invention have been set forth only for the purposes of example, and that they should not be taken as limiting the invention as defined in the following claims.

The words used in this specification to describe the present invention are to be understood not only in the sense of their commonly defined meanings, but to include by special definition, structure, material, or acts beyond the scope of the commonly defined meanings. The definitions of the words or elements of the following claims are, therefore, defined in this specification to include not only the combination of elements that are literally set forth, but all equivalent structure material, or acts for performing substantially the same function in substantially the same way to obtain substantially the same result.

In addition to the equivalents of the claimed elements, obvious substitutions now or later known to one of ordinary skill in the art are defined to be within the scope of the defined elements.

The claims are thus to be understood to include what is specifically illustrated and described above, what is conceptually equivalent, what can be obviously substituted and also what incorporates the essential idea of the invention.

Now that the invention has been described,

I claim:

1. A method for casting a vaned diffuser (101) of a type used in a turbocharger for receiving high velocity air from a compressor wheel and supplying compressed air to an internal combustion engine, said vaned diffuser consisting mainly of a non-ferrous metal or alloy having a melting point of less than about 700° C., and said diffuser comprising an upper surface (105) and a plurality of vanes (113) radially disposed on said upper surface, the method comprising: (a) providing a male metallic template (201) comprising at least the upper surface of said diffuser (105) and further comprising a central hub (205) having an axis (207) approximately perpendicular to said upper surface; (b) casting a female plaster mold corresponding to said male metallic template by contacting said template with a plaster slurry within a suitable frame and permitting said slurry to harden; (c) separating the female plaster mold from the male metallic template by pulling along said axis (303); (d) filling said female plaster mold with a molten non-ferrous metal or alloy having a melting point of less than about 700° C.; (e) cooling said mold to form a raw vaned diffuser casting (407); (f) separating the raw vaned diffuser casting from the female plaster mold by pulling along said axis (403); and (g) finish machining the raw vaned diffuser casting (407) to form the vaned diffuser (101).

2. The method according to claim 1, in which said vaned diffuser consists mainly of aluminum or an aluminum alloy.

3. The method according to claim 1, wherein said hub (205) further comprises a plurality of ribs (209) radially disposed around said axis and axial to said upper surface.

4. The method according to claim 3, further comprising the step of evacuating said female plaster mold during step (e).

5. The method according to claim 3, wherein said vaned diffuser (101) is separated from said raw vaned diffuser casting (407) by machining away material disposed between said hub (205) and said vanes (113).

6. The method according to claim 5, wherein said ribs (209) and said vanes (113) of said male metallic template (201) are radially separated, wherein the ratio of the diameter of the template to the distance of the separation is from about 10 to about 15.

7. The method according to claim 1, further comprising the step, between steps (f) and (g), of machining the lower surface of said raw vaned diffuser casting.

8. The method according to claim 1, further comprising the step, between steps (f) and (g), of machining the outer circumferential edge of said raw vaned diffuser casting.

9. The method according to claim 1, further comprising the step, between steps (f) and (g), of tempering the raw vaned diffuser casting.

10. The method according to claim 9, wherein said raw vaned diffuser casting includes a central hub having an axis approximately perpendicular to said upper surface as defined by said male metallic template, and wherein said raw vaned diffuser casting is gripped for machining by said hub.

11. A method for manufacturing a vaned diffuser (101) of a turbocharger, said method comprising casting in a plaster mold and as one piece, a disc-shaped portion (103) defining one surface of the diffuser and a plurality of diffuser vanes (113) extending from said surface, and a central hub having an axis approximately perpendicular to said surface as defined by said surface of said disc-shaped portion wherein said diffuser has an axis (115) for separating said disc-shaped portion (103) and diffuser vanes (113) from a rigid mold thereof by translation along said axis, and wherein said one piece casting is gripped by said hub for machining to separate the hub from said disc-shaped portion.

12. The method according to claim 11, wherein said hub (205) further comprises a plurality of ribs (209) radially disposed around said axis and axial to said axis.

* * * * *